March 31, 1931. H. E. NIETSCHE 1,798,269
POWER TRANSMISSION APPARATUS
Filed Aug. 22, 1929 2 Sheets-Sheet 1
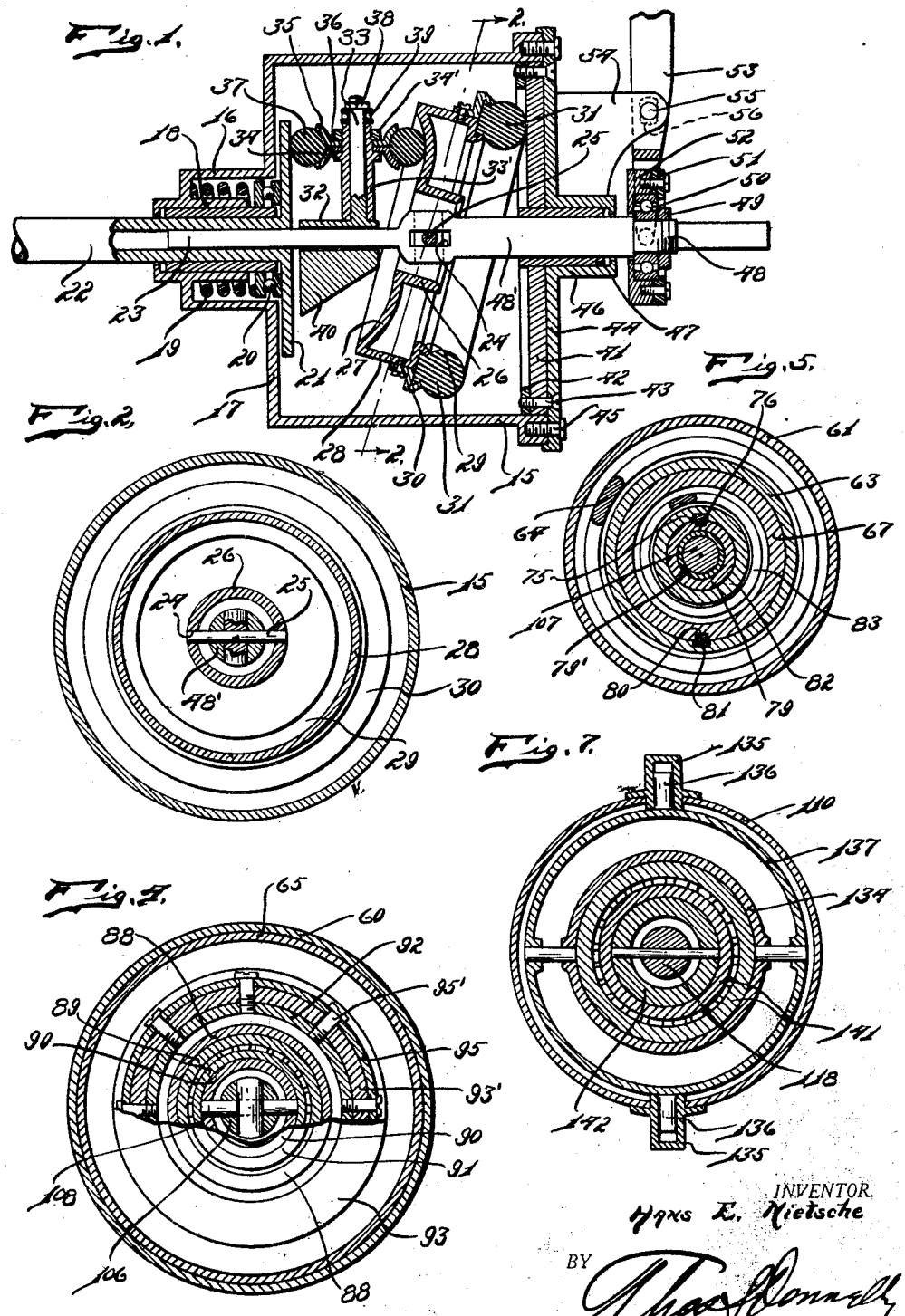
INVENTOR.
Hans E. Nietsche
BY
ATTORNEY.

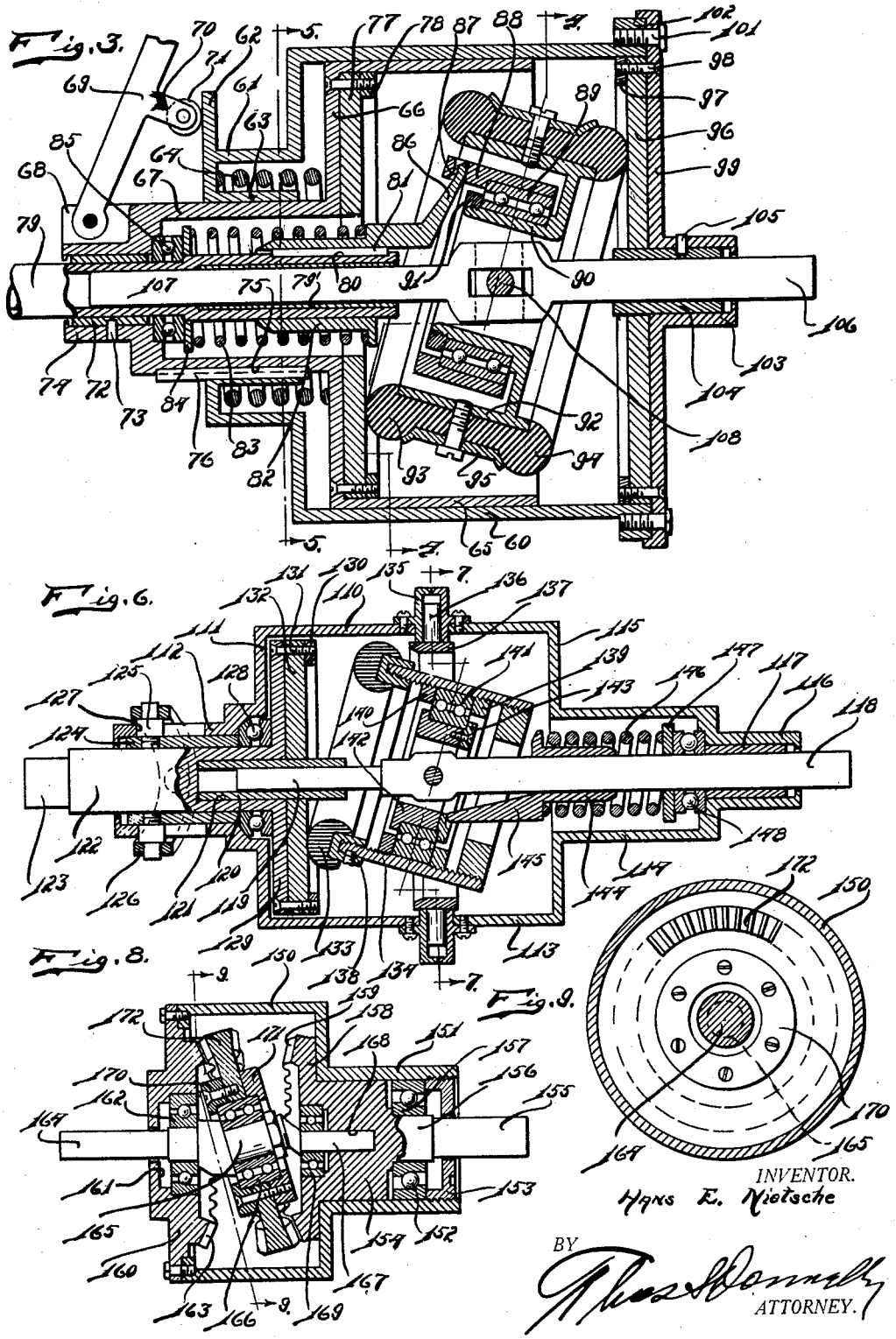

Patented Mar. 31, 1931

1,798,269

UNITED STATES PATENT OFFICE

HANS E. NIETSCHE, OF DETROIT, MICHIGAN

POWER-TRANSMISSION APPARATUS

Application filed August 22, 1929. Serial No. 387,600.

My invention relates to a new and useful improvement in a power transmission apparatus adapted particularly for accelerating and retarding speeds so that the device while transmitting the power may be utilized for stepping the speed up or down.

It is an object of the present invention to provide a device of this class whereby the driving part will rotate in the same direction as the driven part at variable speeds.

It is another object of the invention to provide a device of this class which will be simple in structure, economical of manufacture and highly efficient in use.

Another object of the invention is the provision of a device of this kind whereby the variation in speeds of the driven parts may be easily and quickly altered.

Other objects will appear hereinafter.

The invention consists in the combination and arrangement of parts hereinafter described and claimed.

The invention will be best understood by a reference to the accompanying drawings which form a part of this specification, and in which, Fig. 1 is a central vertical sectional view of the invention.

Fig. 2 is a sectional view taken on line 2—2 of Fig. 1.

Fig. 3 is a central vertical sectional view of a modified form of the invention.

Fig. 4 is a view taken on line 4—4 of Fig. 3.

Fig. 5 is a view taken on line 5—5 of Fig. 3.

Fig. 6 is a central vertical sectional view of a further modified form of the invention.

Fig. 7 is a view taken on line 7—7 of Fig. 6.

Fig. 8 is a central vertical sectional view of a further modified form of the invention.

Fig. 9 is a view taken on line 9—9 of Fig. 8.

The principle of operation in all of the various forms is essentially the same, the various forms being illustrated to indicate the adaptability of the invention to different conditions and different types of construction. In the form shown in Fig. 1, the invention comprises a housing 15 having an end wall 17 provided with an outwardly projecting neck 16, centrally of the base of which is projected inwardly the neck 18. Embracing the neck 18 is a coil spring 19 bearing at one end against the thrust bearing 20 which rests against the flange 21 projecting outwardly from one end of the tubular driving shaft 22. Slidably and rotatably mounted in the driving shaft 22 is a shaft 23 provided with a slot 24 to effect a universal connection by the pin 25 with the cylindrical portion 26 which projects from one face of the concave disc 27, this disc 27 having the axially extending flange 28 provided with the inwardly projecting angularly turned flange or locking bead 29 which cooperates with the detachable locking bead 30 for securing the friction ring 31 in position, this ring being formed from suitable material such as metal, fiber or a yieldable material. The disc 27, with the cooperating parts for securing the annular member 31 in position, may be termed the impeller. Loosely mounted on the shaft 23 is a head 32 extending outwardly from which is a shaft 33 projected through a sleeve 33' which is provided intermediate its ends with the peripheral collar 34 which cooperates with the nut 34' to clamp the clamping members 35 and 36 in position to retain the friction ring 37 in position concentrically of the shaft 33. A thrust bearing 39 abuts against the nut 38 which is threaded on the shaft 33. The head 32 is provided at one side with a projection 40 which serves as a counter-weight to counter-balance the shaft 33. A friction disc 41 is held in position by the ring 42 and the screws 43 on the end plate 44 which is secured to the housing 15 by means of screws 45. A neck 46 projects outwardly from the plate 44 and serves as a bearing for the bushing 47 in which the shaft 48' is journalled. The shaft 48' is provided with the reduced portion 48 on which is threaded the nut 49 to retain in position the bearing 50. A ring 51 is threaded on the ring 52 so as to grip the bearing 50 and the ring 52 is connected to the rockable lever 53 which is rockably mounted on the bracket 54 projecting outwardly from the plate 44, a pin 55 being projected through the slot 56 formed in the lever 53 and through the bracket 54.

In operation, when the shaft 22 is set into rotation, the flange 21 will rotate to effect a rotation of the annular member 37 about the shaft 23. The engagement of the member 37 with the disc 27 will effect a rotation and oscillation of the member 31 and bring about a rotation of the shaft 48'. The speed of rotation of the shaft 48' will depend upon the degree of tilt of the impeller and this degree may be regulated by moving the shaft 48' axially by rocking the lever 53. The variation in speed and variation in torque will be proportional to the difference between the distance from the center of the pin 25 to the point of contact of the member 31 with the disc 41 and the distance from the same point of contact perpendicularly of the shaft 48 to the central axis thereof. When the impeller is brought to a position so as to lie in a plane at right angles to the shaft 48' a rotation of the shaft 22 will not effect or transmit rotation to the shaft 48'. As the tilt of the impeller is carried, the spring 19 will serve to maintain the member 37 in engagement with the disc 27 and the flange 21. In this way a speed reduction may be effected with the shaft travelling at a reduced rate of speed in the same direction as the driven shaft. In operation, this device also performs the function of a clutch and a brake. Furthermore, it is believed evident that the friction members of the various machines may be substituted with gears and made non-variable.

In the form shown in Fig. 3, I have provided a housing 60 with the neck 61 projecting outwardly from one of the end walls of the housing and provided with the peripheral flange 62 and the inwardly projecting cylindrical neck 63 which is embraced by the spring 64. A cup-shaped member 65 is slidably mounted in the housing 60 and provided on its base 66 with an outwardly projecting neck 67 having a lug 68 formed thereon on which is pivotally mounted the lever 69 provided with the lug 70 projecting outwardly therefrom and serving as a support for the roller 71 which engages the outer face of the flange 62. A bushing 72 is mounted in the reduced portion 74 of the neck 67 and retained in position by the pin 73. A key-way or groove 75 is formed in the periphery of the neck 67 and a key 76 is slidably mounted therein, this key also engaging in a key-way formed in the inner surface of the member 63 so as to lock these members against relative rotation while permitting relatively axial movement.

Mounted on the inner surface of the base 66 is a friction disc 77 held in position by the ring 78. Projecting through the bushing 72 is a tubular drive shaft 79 having a key-way 80 formed in its periphery in which is positioned the key 81 also engaging in a key-way formed in the inner surface of the cylindrical member 82 so as to lock these parts against relatively rotary movement. A spring 83 embraces the member 82 and engages at one end a washer 84 which abuts against a thrust bearing 85. Projecting diagonally outwardly from the end of the member 82 is an arm 86 engaging in an eyelet 87 formed in a ring 88 which embraces the roller bearing 89 positioned on the cylindrical neck 90 and held in position thereon by a ring 91, this neck 90 being formed integral with the annular member 92 which serves as a support for the annular friction members 93 and 94 which are held in position by the clamping ring 95.

A friction disc 96 is secured by the ring 97 and the screws 98 to the end wall 99 of the housing 60, this end wall being held in position by screws 101 projecting therethrough and threaded into bosses 102 formed on the member 60. Projecting centrally from the outer face of the end wall 99 is a neck 103 in which engages a bushing 104 held in position by the pin 105. Projecting through the bushing 104 is a shaft 106 which is in alignment with the portion 107 engaging slidably in the bushing 79' and in the tubular shaft 79 and which is connected by a universal connection 108 to the cylindrical member 90.

In operation, when the shaft 79 is rotated, the arm 86 will effect a rotation of the ring 88 and this will effect an oscillation and a rotation of the impeller which will bring about a rotation of the shaft 106, the speed of rotation depending upon the tilt of the impeller. This tilt may be varied by rocking of the lever 69, the springs 83 and 64 compensating for each other as the change in tilt is effected so as to maintain a close contact between the annular friction member 94 and the disc 96 and the annular friction member 93 and the friction disc 77. The housing 60 and the cup-shaped member 65 are non-rotative relatively to each other but axially movable, the key 76 keying these parts together.

In Fig. 6 I have shown a housing 110 which is cup-shaped and projecting outwardly from the base 111 of which is the neck 112. A cup-shaped member 113 is secured to the member 110 to form an enclosed housing, a neck 114 projecting outwardly from the base 115 and having the reduced neck 116 in which is positioned the bushing 117, and through which projects the driving shaft 118. This driving shaft 118 is provided with a reduced portion 119 which projects into the bushing 120 which is positioned in the socket 121 formed in the end of the shaft 122 which is connected to the reduced shaft 123, the member 122 forming the driven part. Threaded into the bushing 124 are screws 125 projecting through a yoke 126 and engaging in a slot 127 formed in the neck 112. A rocking of the yoke 126 will effect an axial movement of the bushing 124 relatively to the neck 112.

The end of the bushing engages against a thrust bearing 128 which engages the peripheral flange 129 formed on the end of the shaft portion 122, this shaft portion being slidable. Secured on the inner face of the disc 129 by means of the ring 130 and the screws 131 is a friction disc 132 engaging against which is an annular friction member 133 carried on the cylinder 134. Mounted at the intersection of the housing sections 113 and 110 are housings 135 in each of which is journalled a trunnion 136 projecting outwardly from the ring 137. On this ring is pivotally mounted the cylinder 134. A ring 138 is threaded onto one end of the cylinder 134 and serves to carry the annular contact member 133. Rings 139 and 140 are threaded into the cylinder 134 to retain in position the bearing 141 which engages in a recess formed in the ring 142 and which is held in position thereon by the ring 143, the ring 142 being pivotally attached by a pin to the shaft 118. Embracing the shaft 118 is a sleeve 144 projecting outwardly from which is the arm 145 engaging in a notch in the ring 143. A coil spring 146 embraces the sleeve 144 and engages at one end the washer 147 which abuts against the thrust bearing 148.

In operation, when the driving shaft 118 is rotated, the ring 142 will be rotated because an oscillation of the cylinder 134 and effecting a rotation of the disc 132.

It is believed evident that the device described in the various forms will work at variable speeds of revolution by using an oval, elliptical, or uniformly irregular shape of friction member 31 or 133.

In the form shown in Fig. 8 I have illustrated the invention adapted for use where a gearing is desired. The housing 150 is provided with the neck 151 in which is positioned the thrust bearing 152 held in position by the plug 153. A head 154 is positioned in the neck 151 and provided with the shaft 155, an enlarged portion 156 of which engages in the roller bearing 157. A flange 158 is formed in the inner end of the head 154 and provided with teeth 159 to form a gear adjacent its periphery. The housing 150 is closed at the opposite end by an end wall or cap 160 having a recess 161 in which is positioned the bearing 162. A gear 163 is formed on the inner face of the cap 160 journalled in the bearing 162 and projecting through the cap is a shaft 164 having the angularly turned portion 165 on which is positioned the bearing 166. The angularly turned portion 167 of the shaft is journalled in a socket 168 formed in the head and also projected through the bearing 169. Secured on the bearing 166 in embracing relation by means of the rings 170 and 171 is a ring 172 having teeth formed on its opposite sides, the teeth on one side meshing with the gear 163 and the teeth on the opposite side meshing with the teeth 159. The operation of this form is as already described, a rotation of the shaft 164 effecting a rotation of the shaft 155, a variation in speed being determined by the inclination of the impeller and this inclination being determined by the angularity of the crank or shaft 165. The variation of speed between the driving and driven shafts is proportional to the difference in the teeth on the impeller gear 172 and the gears 159 and 163 and this difference, consequently, regulates the inclination of the cross crank 165. The impeller is provided with a single tooth more than the other gears and the difference in speed is dependent upon the number of teeth in the gears.

The mechanical movement described can be applied to various forms of power transmission or various other power transmitting systems of machinery where the impeller of a different structure either impels or propels in a liquid or a gas or where its propulsion is electro-magnetically brought about.

While I have illustrated and described the preferred form of my invention, I do not wish to limit myself to the precise details of structure shown but desire to avail myself of such variations and modifications as come within the scope of the appended claims.

Having thus described my invention, what I claim as new and desire to secure by Letters Patent is:

1. A device of the class described, comprising: a driving shaft; an annular oscillatory member; an annular concentric portion on said oscillatory member spaced inwardly thereof; a driven shaft projected through said oscillatory member and journaled at opposite sides thereof; means for connecting said driven shaft by a universal connection to said annular portion; and means rotatable upon rotation of said driving shaft engaging said annular portion and effecting oscillation of said oscillatory member.

2. A device of the class described, comprising: a driving shaft; an annular oscillatory member; an annular concentric portion on said oscillatory member spaced inwardly thereof; a driven shaft projected through said oscillatory member and journaled at opposite sides thereof; means for connecting said driven shaft by a universal connection to said annular portion; and means rotatable upon rotation of said driving shaft engaging said annular portion and effecting oscillation of said oscillatory member; and means for tilting said oscillatory member relatively to said driven shaft.

3. A device of the class described, comprising: a driving shaft; an oscillatory member; a driven shaft projected through said oscillatory member and journaled at opposite sides thereof; means for connecting said driven shaft by a universal connection to said oscillatory member centrally thereof; and means rotatable upon rotation of said driving shaft for effecting oscillation of said oscillatory member; and means for tilting said oscillatory member relatively to said driven shaft; and a plurality of springs for resisting tilting movement of said oscillatory member.

4. A device of the class described, comprising: a driving shaft; an oscillatory member; a driven shaft projected through said oscillatory member and journaled at opposite sides thereof; means for connecting said driven shaft by a universal connection to said oscillatory member centrally thereof; and means rotatable upon rotation of said driving shaft for effecting oscillation of said oscillatory member; and means for tilting said oscillatory member relatively to said driven shaft; and a plurality of concentrically arranged springs for affecting the tilting movement of said oscillatory member.

5. A device of the class described, comprising: an oscillatory member; an annular concentric portion on said oscillatory member spaced inwardly thereof; a shaft projected through said oscillatory member and journaled at opposite sides thereof and connected by a universal connection with said annular portion; and rotatable means engaging said annular portion and effecting an oscillation and rotation of said oscillatory member.

6. A device of the class described, comprising: an oscillatory member; an annular concentric portion on said oscillatory member spaced inwardly thereof; a shaft projected through said oscillatory member and journaled at opposite sides thereof and connected by a universal connection with said annular portion; rotatable means engaging said annular member for effecting an oscillation and rotation of said oscillatory member; means for tilting said oscillatory member to various angles of inclination relatively to said shaft; and resilient means for resisting tiltable movement of said oscillatory member in one direction.

7. A device of the class described, comprising: a driving shaft; an oscillatory member; an annular concentric portion on said oscillatory member spaced inwardly thereof; a driven shaft projecting through said oscillatory member; means for connecting said driven shaft by a universal connection to said annular portion; means rotatable upon rotation of said driving shaft and engageable with said annular portion for effecting oscillation of said oscillatory member, said means being always in fixed axial relation to said oscillatory member; and means for tilting said oscillatory member relatively to said driven shaft.

8. In a device of the class described: an annular oscillatory member; an annular concentric portion on said oscillatory member spaced inwardly thereof; and rotatable means engageable with the periphery of said annular portion for effecting an oscillation of said oscillatory member, said rotatable means being in fixed axial relation to said oscillatory member; and means for tilting said oscillatory member to various positions.

In testimony whereof I have signed the foregoing specification.

HANS E. NIETSCHE.